July 29, 1941.  W. A. WISSLER  2,250,561
METHOD FOR APPLYING METAL LAYERS
Filed Jan. 12, 1939
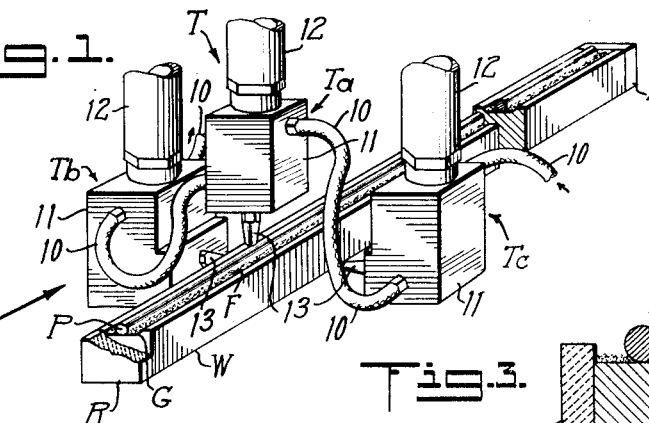
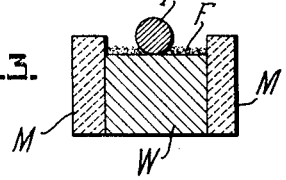
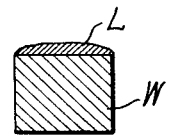
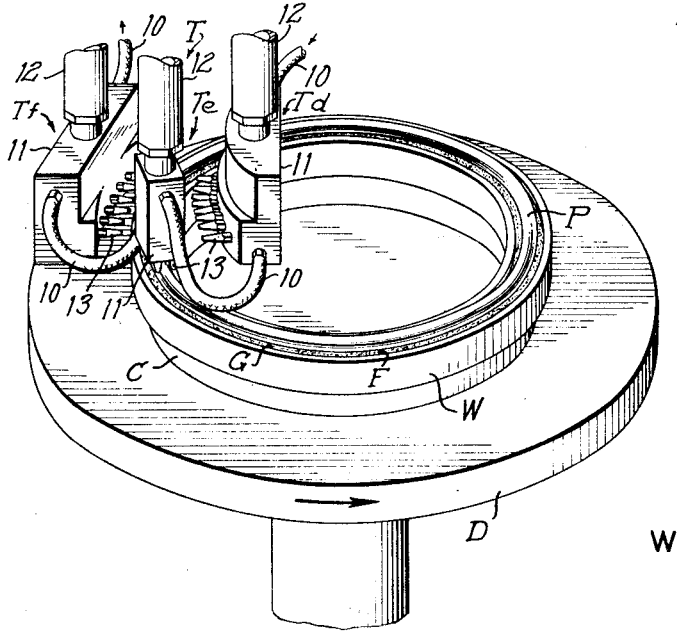
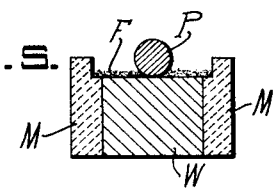
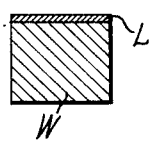
INVENTOR
WILLIAM A. WISSLER
BY
ATTORNEY Patented July 29, 1941

2,250,561

UNITED STATES PATENT OFFICE 2,250,561

METHOD FOR APPLYING METAL LAYERS

William A. Wissler, Niagara Falls, N. Y., assignor to Haynes Stellite Company, a corporation of Indiana Application January 12, 1939, Serial No. 250,503

2 Claims. (Cl. 29—188)

The invention relates to the production of composite articles consisting of a surface layer of protective metal united to tougher metal base or backing.

The invention is particularly applicable to the production of articles having a hard, oxidation and wear resistant surface layer composed of a protective alloy of the cobalt-chromium-tungsten type, for instance "Stellite," and will be described with reference to an alloy of that type. However, it will be apparent as the description proceeds that other protective metals and alloys are adaptable for the purposes of the invention and that the advantages described are applicable to such materials.

The useful life of tools or workpieces, such as shear blades, trimming dies, tool blades and valve seats, is prolonged if the wearing surfaces are formed of a hard, wear resistant alloy. Such surfaces are usually applied to the workpiece by an ordinary hand-operated fusion deposition method, in which an alloy welding rod is melted, and the molten metal united to the workpiece, by means of a high temperature oxy-acetylene flame. The foregoing method, although widely used, possesses disadvantages. It is slow and requires careful attention on the operator's part in order to produce a properly bonded joint while simultaneously preventing dilution of the protective alloy by the metal of the workpiece. Further, it is difficult to produce a smooth, even deposit of uniform thickness and, due to the limited machinability of the alloy, excess metal must be removed after the welding step by a machining or grinding operation which is slow and costly. Alloys of the "Stellite" type are relatively expensive, and it is desirable to limit the amount of such excess metal.

An object of this invention is to provide an automatic or semi-automatic method for rapidly and efficiently applying a relatively smooth and uniform layer of protective metal of the "Stellite" type to a metal workpiece. The manner in which this and other objects are attained by the invention will be apparent from the following description and drawing, in which:

Fig. 1 is a perspective view of an arrangement of a substantially straight metal workpiece, protective metal, and a torch assembly, in position for practicing the method of the invention, parts being broken away;

Fig. 2 is a perspective view of an arrangement of a curved metal workpiece, protective metal, and a torch assembly, in position for practicing the method of the invention;

Fig. 3 is a sectional view of an alternative arrangement of a workpiece and protective metal, together with a refractory form for retaining the protective metal on the surface of the workpiece;

Fig. 4 is a sectional view of the workpiece shown in Fig. 3 after completion of the surfacing operation of the invention;

Fig. 5 is a sectional view of another arrangement of a workpiece and protective metal, together with a refractory form suitable for retaining the protective metal on the surface of the workpiece and for providing a slight overlap of protective metal along the wearing edges of the workpiece;

Fig. 6 is a sectional view of the workpiece shown in Fig. 5 after completion of the surfacing operation; and Fig. 7 is a sectional view of the surfaced workpiece of Fig. 6 after being suitably shaped for service, as by grinding.

In accordance with the method of the invention, a long surface zone of a metal workpiece of small cross-sectional size is prepared to receive the protective metal by forming a suitable enclosure on or about its surface. Such an enclosure may be provided by recessing the surface of the workpiece which it is desired to protect, or by enclosing the desired surface of the workpiece within a suitable mold. The protective metal, preferably in the form of a rod, fragments thereof, or pellets, and in an amount sufficient when melted and united to the workpiece to provide the desired thickness and area of protective layer on the surface of the workpiece, is introduced in said enclosure. Preferably, when utilizing a flux a suitable comminuted flux is spread over the enclosed surface of the workpiece after the protective metal has been placed in position. However, the flux may be introduced in other ways. For instance, the protective metal may be coated with the flux or the flux may be painted on the enclosed surface. Successive portions of the workpiece and adjacent successive portions of the protective metal are then preheated, and the portions of the protective metal are melted and united to the surface of the workpiece by the application of high temperature heat.

Suitable preheating and melting temperatures may be provided by a plurality of fuel-oxygen torches so assembled that preheating jets are directed against side surfaces of the workpiece, in advance of, and in fixed relation to melting jets directed against the protective metal. The torch assembly may be progressively moved with respect to the workpiece or, alternately, it may be held in a fixed position and the workpiece progressively moved with respect to said assembly. Either procedure provides a uniform and progressive melting and uniting of the protective metal with the workpiece.

In accordance with the preferred procedure of the invention, illustrated by Fig. 1, a metal workpiece W is prepared to receive a layer of protective metal by machining or otherwise suitably forming a recess G along the surface of the workpiece W upon which it is desired to provide the layer of protective metal. The protective metal, for instance, "Stellite," preferably in the form of a rod P, and of sufficient volume to fill or slightly underfill said recess when melted, is placed in the recess G, and a relatively thin layer of finely divided flux F is then sprinkled over the surface of the rod P and the recess G. The ends of the recess G may be dammed as with suitable refractory blocks R, S.

To preheat the workpiece W and to melt and unite the protective metal with said workpiece, a torch assembly T is progressively moved in the direction of the large arrow along the surface of the workpiece W. The torch assembly T comprises two side preheating fuel-oxygen torches Tb, Tc, and a welding torch Ta. The three torches Ta, Tb, and Tc are essentially the same in construction. Each comprises a water-cooled torch manifold 11 into which the fuel-oxygen mixture is introduced through a conduit 12, a torch tip 13, and conduits 10 for circulating the cooling medium through said torch. It is preferable that the torches in their assembly be so positioned with respect to each other that the preheating jets emanating from the two side preheating torches Tb, Tc strike the workpiece in advance of the jet emanating from the welding torch Ta. The movement of the torch assembly T along the workpiece W may be manual or a suitable movable carriage may be provided to support the torch assembly T and to move it progressively and uniformly along said workpiece. As the torch assembly T is moved along the workpiece W, the preheating jets heat the side surfaces of the workpiece W, and simultaneously slightly heat the rod P. The rod P is then progressively melted and the molten metal united to the preheated portion of the workpiece W by the jet of the welding torch Ta.

In the procedure of the invention illustrated by Fig. 2 an arrangement is shown for the treatment of the wearing surface of a large gate valve. In this instance the workpiece W is also prepared by forming a recess G along its surface. The workpiece W is then supported on a refractory ring C which is in turn supported on a revolvable work table D. The rod P of protective metal, bent in the form of a ring and preferably continuous, is placed in the recess G and a quantity of flux F sprinkled on the surface of the rod P and the recess G. A suitable high temperature heat may be provided by a torch assembly T comprising two side preheating torches Tf, Td, and a melting torch Te. The torches are essentially the same in construction as those described with respect to the procedure illustrated by Fig. 1, with the exception that large manifolds 11 and multiple torch tips 13 are provided on each torch, making it possible to attain higher preheating and melting temperatures more rapidly. The torch assembly T is suitably supported over the workpiece W.

In carrying out the preheating and melting steps the gases emanating from the preheating torches Td, Tf are ignited and the work table D is caused to revolve uniformly in the direction of the large arrow. After about one-quarter revolution of the work table D, the gases from the welding torch Te are ignited. The work table D continues to revolve until successive portions of the workpiece W are preheated, and adjacent successive portions of the protective metal rod P caused to melt and unite to the surface of the workpiece W by the application of the high temperature heat from the welding torch Te.

While it is desirable to recess the surface of the workpiece W preparatory to the melting and uniting operation of either of the foregoing procedures, it may be prepared as illustrated by Fig. 3, that is, by enclosing it within a refractory mold M. A flux F, and a rod P of protective metal are then placed within the enclosure formed by the mold M, and the preheating and melting operations carried out as described.

A workpiece W having a layer L of protective metal united to a surface of said workpiece by the method of the invention and employing the refractory mold M shown in Fig. 3, is illustrated by Fig. 4.

Another method of preparing the surface of a workpiece W (Fig. 5), particularly if it is essential that the finished workpiece have one or more relatively sharp wearing edges, such as a shear blade, is to enclose it within a refractory mold M so shaped that a slight overhang is imparted to the layer of protective metal. A workpiece W which has been prepared in the foregoing manner and provided with a layer L of protective metal is illustrated by Fig. 6. A similar workpiece W after being suitably formed and thus prepared for service is illustrated by Fig. 7.

It is apparent that the workpiece may be prepared in many different ways to receive the protective metal and that the size, type of workpiece, and other factors have to be taken into consideration in determining the most desirable manner of such preparation. Furthermore, while I have specifically described the use of torch assemblies in which two side preheating torches are employed, the invention is not limited to such heating means. In some applications it may be desirable to employ only one preheating torch, as when applying a surface layer of protective metal to the edge of a comparatively wide workpiece. It may also be desirable to dispense entirely with torch preheating and to preheat the workpiece by other means, or to employ a combination of preheating means. For example, the workpiece may be preheated in a muffle or other furnace to a suitable temperature, the protective metal placed on said workpiece, and the protective metal then progressively melted and applied to said workpiece in accordance with the method of the invention, either with or without the use of one or more side preheating torches.

The method of the invention, as herein described, permits the application of a relatively smooth, uniform, well-bonded layer of protective metal to the surface of a workpiece at a rate faster than that attainable by ordinary hand-operated methods. Further, the amount of grinding or machining necessary to complete the workpiece for ultimate use is considerably less than that required for a workpiece "surfaced" by prior manual methods. Finally, the method is applicable, not only to the use of "Stellite," but to other protective metals and alloys, such as "Monel" metal, bronze, and stainless steel.

I claim:

1. Method of forming a layer of protective metal of substantially uniform composition on the surface of a curved metal workpiece which comprises recessing an uppermost surface of the workpiece to receive the protective metal; introducing all of the protective metal in a substantially continuous mass within said recess; preheating the workpiece to a temperature below its melting point, and below the melting point of said protective metal, by directing at least one preheating oxy-acetylene flame against a surface of said workpiece other than that in which the recess is formed; directing a melting flame against the upper surface of the protective metal, but no flame upon said upper surface of the workpiece; and progressively uniting said protective metal to the recessed surface of said workpiece, the preheating operation closely and continuously preceding the melting operation.

2. A method of forming a continuous layer of wear-resistant alloy upon a long surface zone of a metal workpiece of small cross-sectional size, which method comprises positioning the workpiece with said zone uppermost providing an alloy receiving recess along said zone; introducing a body of said alloy within said recess; directing a melting flame onto successive portions of said alloy body only, and moving said melting flame along said zone at a substantially constant speed; directing at least one preheating flame upon at least one surface of said workpiece other than the top, but no flame upon said top surface of the workpiece; and moving said preheating flame or flames parallel to said melting flame at a constant distance in advance thereof.

WILLIAM A. WISSLER.